Patented Nov. 29, 1938

2,138,137

UNITED STATES PATENT OFFICE 2,138,137

ADHESIVE

Walter D. Bowlby, Wilmington, Del., assignor to Hercules Powder Company, Wilmington, Del., a corporation of Delaware No Drawing. Application February 21, 1935, Serial No. 7,557

1 Claim. (Cl. 134—79)

This invention relates to an improvement in adhesive and more particularly relates to that type of adhesive which includes nitrocellulose as an ingredient.

Heretofore, while various types and kinds of adhesive have been known and used, none has been found satisfactory for general and universal use. Thus, adhesives heretofore have generally comprised homogeneous solutions requiring solvent evaporation for "set up" and in their use it has been customary, and in many cases essential, after application of an adhesive to allow partial evaporation of solvent before articles to be adhered are placed together and then to apply heat and pressure to secure a good bond. Again, the so-called "fast" adhesives heretofore known are generally of a highly viscous, stringy, gummy character and are difficult to use in packaging, joining, cementing, and the like, machines. Further, adhesives of the type including a solvent, as heretofore known, have a specific viscosity for a given solids content and consequently a desired change in fluidity or viscosity of a given adhesive necessitates a complete and usually large change in the ratio of solids to solvent with corresponding disadvantage from excess tackiness or necessity for preliminary drying after application and before articles to be adhered are joined. Thus, where an adhesive is to be adapted to several jobs, requiring different consistencies of the adhesive, the adhesive must be laboriously reformulated and with each reformulation will present different characteristics. Adhesives as heretofore known have also been open to the objection that in general they will not adhere to wet surfaces and will not adhere at all to surfaces of various kinds.

Now in accordance with this invention an adhesive is provided which will have universal adaptability and which will be characterized by a high solids content and, at the same time, a low viscosity. The adhesive in accordance with this invention may be widely varied in specific viscosity without appreciably changing its solids content and its solids content can be widely varied without appreciable change in specific viscosity. The adhesive will be exceedingly fast and may have instantaneous set up without the necessity for the evaporation of any solvent. Further, the adhesive will have a universal adhesion to surfaces irrespective of material and characteristics, and to wet surfaces; and materials joined by the adhesive will have improved strength of union over that obtained with prior known adhesives.

More particularly, the adhesive in accordance with this invention will comprise a substantially water-immiscible adhesive base solution of high solids content emulsified in disperse phase in water, in which a further quantity of substantially water-immiscible adhesive base solution or a substantially water-immiscible ingredient or ingredients thereof is or are emulsified as a distinct disperse phase. The adhesive will be characterized, more particularly, in that it will comprise a plurality of disperse phases emulsified in relatively a very small amount of water with respect to the amount of the disperse phases taken together. Generally speaking, the water phase will comprise less than 25% and desirably about 10% of the emulsion.

From the specific standpoint the adhesive in accordance with this invention will comprise an aqueous emulsion of a substantially water-immiscible nitrocellulose cement of high solids content in water, in which nitrocellulose cement, or an ingredient thereof, will be emulsified as a distinct disperse phase, the emulsion being characterized by relatively very low water content.

In adhesives in accordance with this invention the adhesive base solution may include, as a film forming base, nitrocellulose, ethyl cellulose, rosin derivatives, chlorinated rubber, or the like, with or without other ingredients, as oils, natural or synthetic gums or resins, and the like, ingredients of adhesives, and a suitable solvent or solvent mixture.

The adhesive base solution will be of high solids content and of high viscosity. Thus, for example, the base solution will desirably have a solids content within about the range 25%–85%. In the case of nitrocellulose base solutions the nitrocellulose content will be within about the range 10%–50%. The viscosity of the base solution, more particularly when such contains nitrocellulose, will, for example, be such that a steel ball will require 500–30,000+ seconds to drop through ten inches of the solution contained in a tube of one inch interior diameter and maintained at a temperature of 25° C.

In addition to nitrocellulose, or other film-forming base, the adhesive base solution may contain water-immiscible non-volatile liquid and/or solid ingredients, as, for example, castor oil, plasticizers, resins, etc., as, for example, a synthetic resin, as ester gum, a glyceryl phthalate resin, or a linseed oil fatty acid modified phthalic anhydride-glycerin resin, or a fatty acid modified terpinene-maleic anhydride resin, or other suitable or desired non-volatile or solid ingredient or ingredients.

As the solvent for the solid ingredients, and especially when nitrocellulose is included, any suitable water-immiscible solvent may be used, as, for example, hexyl acetate, octyl acetate, butyl butyrate, butyl lactate, amyl propionate, amyl butyrate, fenchone, methyl cyclohexanone, cyclohexanol acetate, or mixtures thereof, butyl acetate, butyl propionate, amyl acetate, etc. or mixtures thereof.

If desired there may be included with the solvent a suitable water-immiscible diluent such as, for example, xylol, high flash solvent naphtha, petroleum naphtha, toluol, butyl alcohol, amyl alcohol, or mixtures thereof.

In general, it will be preferable to use odorless, relatively low boiling solvents and diluents.

For effecting the emulsification incident to the preparation of the adhesive according to this invention, any suitable emulsifying agent may be used, as, for example, a soap, as sodium oleate, ammonium linoleate, sodium resinate, ammonium oleate, etc., a sulphonated polymerized terpene, gelatin, a sulphonated oil, as sulphonated castor oil, etc., sodium, potassium, lithium, or the like, salts of the higher aliphatic sulphates, preferably containing eight or more carbon atoms, such as, for example, sodium oleyl sulphate, sodium lauryl sulphate, sodium stearyl sulphate, sodium myristyl sulphate, sodium cetyl sulphate, etc., a sodium salt of butyl or isopropyl naphthalene sulphonic acid, as sodium butyl naphthalene sulphonate, etc., oleo glycerol sulphate, methyl cellulose, the sodium salt of sulphuric ester of glycerin-mono-dodecyl ether, the sodium salt of dodecylmercapto acetic acid, etc., or other compounds equivalent therefor.

In proceeding for the production of an adhesive in accordance with this invention in general an adhesive base solution of high solids content and of high viscosity will be prepared and then emulsified in disperse phase in water containing sufficient emulsifying agent in solution. The base solution may, for example, be emulsified in water on a ratio within about the range 2:1–3:1. Desirably the base solution will be emulsified in water on a ratio of upwards of 3:1.

The base solution having been emulsified in water there is added to the emulsion a water-immiscible, non-volatile liquid ingredient, a water-insoluble solid ingredient or a water-immiscible solution comprising a solvent or non-volatile liquid and a solid or solids, as a resin, is then emulsified in the water of the emulsion, as a separate disperse phase, and in amount such as to reduce the water content of the fluid emulsion down below 25% and preferably down to about 10%.

As illustrative, for example, adhesive base compositions may be made up on the following formulae:

FORMULA No. I

| | Parts by weight |
|---|---|
| Nitrocellulose (½ second Hercules) | 25 |
| Castor oil | 37 |
| Alcohol (from the use of alcohol wet nitrocellulose) | 10 |
| Butyl acetate | 14 |
| Toluol | 14 |

FORMULA No. II

| | Parts by weight |
|---|---|
| Nitrocellulose (200 seconds Hercules) | 14 |
| Ester gum | 3 |
| Dibutyl phthalate | 8 |
| Alcohol (from the use of alcohol wet nitrocellulose) | 6 |
| Hexyl acetate | 40 |
| Xylol | 10 |
| Butanol | 10 |
| Naphtha | 9 |

In the preparation of an adhesive either of the above base compositions is emulsified in distilled water in the ratio, for example, of 3:1 through the medium, for example, of 0.5% sodium lauryl sulphate and 1.0% sulphonated castor oil contained in the water. The emulsion will desirably be formed by use of a homogenizer. When the emulsion is formed there is added to it an amount of a water-immiscible, non-volatile liquid, a solid or a water-immiscible solution containing a solid in amount sufficient to bring the water content down below 25% and preferably to about 10%. Any of the non-volatile liquids or solids mentioned above as ingredients of the base solution may be added.

As further and more specifically illustrative, for example, an emulsion may be made up on the following formula:

| | Parts by weight |
|---|---|
| Nitrocellulose (5 seconds Hercules) | 15 |
| Castor oil | 23 |
| Butyl acetate | 19 |
| Toluol | 18 |
| Water containing 1% sodium lauryl sulphate | 25 |

The above emulsion will comprise a solution of nitrocellulose and castor oil in solution in the solvent mixture dispersed in internal phase in the water on the ratio of 3:1, through the medium of the sodium lauryl sulphate. The water will comprise 25% of the emulsion and the solids content will be 38%. To 100 parts of the emulsion is added 100 parts of undissolved drying oil acid modified phthalic anhydride-glycerin resin, which is emulsified in the water as a separate disperse phase by stirring or shaking.

The final emulsion or adhesive will comprise 18% of water and a solids content of 54%. The viscosity of the emulsion or adhesive will, however, be low (about 200 centipoises), rendering it adaptable for general use.

In the preparation of the adhesive as described above, any suitable water-immiscible, non-volatile liquid, or solid may be added to the original emulsion for increase in solids content and reduction of water content. Thus, for example, abietanol, methyl abietate, or chlorinated diphenyl, etc., or a water-immiscible solution of a phthalic anhydride-glycerin resin, a terpinene-maleic anhydride-glycerin resin, or the like. The desired solids or non-volatile content and the water content of the adhesive will, as will now be clear, be obtained through control of the amount of non-volatile liquid or solid addition which is dispersed as a separate internal phase in the water of the emulsion. As a consequence, solids content of the adhesive may be easily and readily varied. At the same time, if it be desirable to lower the viscosity of a given adhesive, such may readily be accomplished by the addition of water.

As an alternative procedure several emulsions comprising adhesive base solutions having different characteristics may be blended and the resultant blend comprising a plurality of disperse phases then reduced in water content and increased in solids content by the addition of a water-immiscible, non-volatile liquid or solid and dispersion thereof in a distinct disperse phase. Thus, for example, adhesive base solutions are made up on the following formulae:

FORMULA A

*High plasticizer—high viscosity*

| | |
|---|---|
| Nitrocellulose (5 seconds Hercules) | 25 |
| Phthalyl glycollate | 25 |
| Butyl acetate | 25 |
| Toluol | 25 |

Formula B

High resin—low viscosity

| | |
|---|---|
| Nitrocellulose (⅛ second Hercules) | 15 |
| Glycol terpinene maleate | 25 |
| Hexyl acetate | 30 |
| Xylol | 30 |

Formula C

High nitrocellulose—medium viscosity

| | |
|---|---|
| Nitrocellulose (½ second Hercules) | 30 |
| Hydrogenated methyl abietate | 10 |
| Butyl acetate | 30 |
| Benzol | 30 |

The base solutions according to the above formulae are, respectively, emulsified in water on the ratio of, for example, 3:1 and the three emulsions blended in any desired proportion, for example, one to one. Into the blend is then stirred three-quarters of its weight of a solution comprising 50 parts linseed oil fatty acid modified phthalic anhydride-glycerin resin in 50 parts of toluol. The resultant emulsion or adhesive will comprise the three base solutions as separate disperse phases and the resin solution as a separate disperse phase. The adhesive will be high in solids, low in water and of a desirable viscosity, all rendering it an excellent, rapid adhesive for general use.

It will now be appreciated that the adhesive in accordance with this invention contemplates essentially an aqueous emulsion including water and the ingredients of an adhesive composition, the non-volatile or solid ingredients being emulsified in the water in a plurality of separate disperse phases. More particularly, the invention contemplates a nitrocellulose-containing adhesive composition.

It will be appreciated that the adhesive in accordance with this invention may comprise any suitable adhesive composition and that while nitrocellulose containing adhesive compositions are preferred, any other suitable film-forming agent, as a base, may be substituted for nitrocellulose.

It will be further appreciated that the method in accordance with this invention involves the dispersion of an ingredient of an adhesive, as an adhesive base solution, in disperse phase in water and then dispersion as a separate disperse phase in the water of the emulsion so formed of a non-volatile liquid or a solid ingredient of the adhesive.

The adhesive in accordance with this invention will be found to be of universal applicability and will readily lend itself to manual application or application in packaging, cementing, joining, or other type of machines utilizing adhesive. The adhesive will also be characterized by quick setting capacity, it being noted that due to the low water content of the emulsion forming the adhesive, the emulsion will break immediately on application and further that the physical action of application will aid in breaking the emulsion. On breaking of the emulsion, the several disperse phases will immediately coalesce with deposit of the adhesive composition, which, due to its very high solids content, will be capable of forming an immediate bond without the necessity for loss of solvent and will, due to the relatively low solvent content, form a permanent bond in a minimum of time.

In using the adhesive, quick setting may be facilitated if the surfaces to which the adhesive is to be applied are first sized with an electrolyte. On application of the adhesive to the surfaces so sized, the electrolyte will act to expedite breaking of the emulsion and coalescence and blending of the several disperse phases.

As will be appreciated, the adhesive in accordance with this invention permits the use of adhesive compositions of such high consistency or lack of viscosity as to have prevented their use heretofore. Likewise, it will be appreciated that any given adhesive in accordance with this invention may be readily varied in consistency or viscosity without material change in its fundamental composition, by the addition of relatively small quantities of water where thinning is desired, or of relatively small quantities of water-immiscible, non-volatile ingredients where thickening is desired. Thus, it will be noted that the consistency of the adhesive may be readily adjusted within a wide range without reformation or without substantial change in solids content.

What I claim and desire to protect by Letters Patent is:

An adhesive characterized by the capacity for the formation of a quick initial set and rapid drying to form a permanent bond, comprising an aqueous emulsion including a substantially water-immiscible, highly viscous nitrocellulose solution containing from about 10% to about 50% nitrocellulose and having a viscosity within the range of about 500 to 30,000 seconds, and a non-volatile ingredient of the adhesive, emulsified as a separate disperse phase in the emulsion, the said emulsion being characterized by containing a percentage of water less than about 25% and preferably about 10% by weight, of the said emulsion.

WALTER D. BOWLBY.